US011965646B2

(12) United States Patent
Hong et al.

(10) Patent No.: US 11,965,646 B2
(45) Date of Patent: Apr. 23, 2024

(54) ULTRA-THIN DOWNLIGHT WITH ENHANCED THERMAL DISSIPATION PERFORMANCE

(71) Applicant: Xiamen PVTECH Co., Ltd., Fujian (CN)

(72) Inventors: Haibo Hong, Fujian (CN); Fuxing Lu, Fujian (CN); Longyin Chen, Fujian (CN)

(73) Assignee: Xiamen PVTECH Co., Ltd.

( * ) Notice: Subject to any disclaimer, the term of this patent is extended or adjusted under 35 U.S.C. 154(b) by 0 days.

(21) Appl. No.: 17/981,489

(22) Filed: Nov. 7, 2022

(65) Prior Publication Data

US 2024/0068654 A1 Feb. 29, 2024

(30) Foreign Application Priority Data

Aug. 26, 2022 (CN) ......................... 202211037286.1

(51) Int. Cl.
*F21S 8/04* (2006.01)
*F21V 29/71* (2015.01)

(52) U.S. Cl.
CPC .............. *F21V 29/713* (2015.01); *F21S 8/04* (2013.01)

(58) Field of Classification Search
CPC ........ F21V 27/02; F21V 15/01; F21V 19/003; F21V 21/03; F21V 21/04; F21V 23/001; F21V 23/002; F21V 31/005; F21S 8/02; F21S 8/026; F21S 8/04; F21S 8/043
See application file for complete search history.

(56) References Cited

U.S. PATENT DOCUMENTS

| | | | | |
|---|---|---|---|---|
| 10,801,681 | B1 * | 10/2020 | Chaimberg | F21V 21/03 |
| 2009/0080198 | A1 * | 3/2009 | Thornton | F21V 7/0091 362/297 |
| 2011/0267827 | A1 * | 11/2011 | Wein | F21V 17/10 362/368 |
| 2013/0128608 | A1 * | 5/2013 | Liao | F21V 29/81 362/606 |
| 2015/0117010 | A1 * | 4/2015 | Auen | G02B 6/4204 29/25.01 |
| 2018/0010779 | A1 * | 1/2018 | Zhou | F21V 29/85 |
| 2018/0283678 | A1 * | 10/2018 | Qian | F21V 21/02 |
| 2020/0224857 | A1 * | 7/2020 | Liang | F21V 14/06 |
| 2020/0232615 | A1 * | 7/2020 | Davis | F21K 9/69 |
| 2020/0284420 | A1 * | 9/2020 | Cordero | H05K 7/20409 |
| 2022/0120394 | A1 * | 4/2022 | Liu | F21S 8/026 |

(Continued)

*Primary Examiner* — Abdulmajeed Aziz
*Assistant Examiner* — Steven Y Horikoshi
(74) *Attorney, Agent, or Firm* — Winston Hsu

(57) ABSTRACT

An ultra-thin downlight with enhanced thermal dissipation performance includes a housing, a light source board and a light cover. The housing includes a first ring portion, a cylindrical portion and a second ring portion connected to each other. The cylindrical portion is disposed between the first ring portion and the second ring portion, such that an accommodating space is formed between the first ring portion, the cylindrical portion and the second ring portion. The light source board is fixed on the inner surface of the second ring portion and disposed in the accommodating space. A portion of the light source board is covered by the second ring portion and the other portion of the light source board is exposed from the second ring portion. The light cover is disposed on the inner surface of the first ring portion.

7 Claims, 9 Drawing Sheets

(56) References Cited

U.S. PATENT DOCUMENTS

| | | | | |
|---|---|---|---|---|
| 2022/0307659 | A1* | 9/2022 | Cohen | F21V 23/0464 |
| 2023/0211037 | A1* | 7/2023 | Lan | F21V 33/0088<br>422/22 |
| 2023/0228392 | A1* | 7/2023 | Presz-Lafreniere | F21S 8/03<br>362/147 |

* cited by examiner

ULTRA-THIN DOWNLIGHT WITH ENHANCED THERMAL DISSIPATION PERFORMANCE

BACKGROUND OF THE INVENTION

1. Field of the Invention

The present invention relates to a downlight, in particular to an ultra-thin downlight with high thermal dissipation performance.

2. Description of the Prior Art

Most of currently available downlights adopts the indirect-lighting type structure with a light guide plate, which tends to generate high thermal energy. As the heat dissipation performance of this type of downlight is low, the light guide plate thereof is apt to be deformed or degraded due to high temperature. For the reason, the service life of this type of downlight tends to decrease.

Further, the thicknesses of currently available downlights adopting the direct-lighting type structure need to be increased because of being limited by the structures thereof. Thus, the size of this type of downlight cannot be reduced, which significantly increases the packaging cost thereof. Besides, the heat dissipation performance of this type of downlight is also low.

Moreover, the structures of currently available downlights need to consume a lot of materials, so the manufacturing cost thereof is greatly increased. Accordingly, the application of currently available downlights is also limited.

Furthermore, the components of a currently available downlight are usually fixed with each other by several spring fixation plates. However, as the user needs to adjust the torque of the above fixation structure and the spring fixation plates tend to be loose due to the improper design of this fixation structure. Thus, the structural stability and the safety of currently available downlights still need to be further improved.

SUMMARY OF THE INVENTION

One embodiment of the present invention provides an ultra-thin downlight with enhanced thermal dissipation performance, which includes a housing, a light source board and a light cover. The housing includes a first ring portion, a cylindrical portion and a second ring portion connected to each other. The cylindrical portion is disposed between the first ring portion and the second ring portion, such that an accommodating space is formed between the first ring portion, the cylindrical portion and the second ring portion. The light source board is fixed on the inner surface of the second ring portion and disposed in the accommodating space. A portion of the light source board is covered by the second ring portion and the other portion of the light source board is exposed from the second ring portion. The light cover is disposed on the inner surface of the first ring portion.

In one embodiment of the present invention, the ultra-thin downlight further includes an elastic ring body. The outer surface of the first ring portion has a ring-shaped groove and the elastic ring body is disposed in the ring-shaped groove.

In one embodiment of the present invention, the ultra-thin downlight further includes a spring fixation plate and a spring buckle. The spring fixation plate is fixed on the outer surface of the second ring portion. One end of the spring buckle is pivotally connected to the spring fixation plate and the other end of the spring buckle is fixed on a peripheral area of the first ring portion.

In one embodiment of the present invention, the spring fixation plate includes a fixation base and a fixation portion connected to each other. The fixation base is fixed on the outer surface of the second ring portion and one end of the spring buckle is pivotally connected to the fixation portion.

In one embodiment of the present invention, the fixation base has a positioning slot and the outer surface of the second ring portion has a positioning block inserted into the positioning slot.

In one embodiment of the present invention, the fixation portion includes two L-shaped hook portions disposed to be opposite to each other and one end of the spring buckle is provided with a spring. The two L-shaped hook portions are inserted into the two ends of the spring, such that the two ends of the spring press against the two L-shaped hook portions.

In one embodiment of the present invention, the second ring portion has a recess and the light source board has a connecting slot corresponding to the recess.

In one embodiment of the present invention, the ultra-thin downlight further includes a connecting wire. One end of the connecting wire has a strain relief portion. The connecting wire passes through the recess and is connected to the connecting slot via the strain relief portion.

In one embodiment of the present invention, the strain relief portion includes a positioning element, a block element and a connecting element. The positioning element is connected to the block element via the connecting element, such that a locking slot is formed between the positioning element and the block element.

In one embodiment of the present invention, the ultra-thin downlight further includes a control box connected to the other end of the connecting wire.

The ultra-thin downlight with enhanced thermal dissipation performance in accordance with the embodiments of the present invention may have the following advantages:

(1) In one embodiment of the present invention, the housing of the ultra-thin downlight includes the first ring portion, the cylindrical portion and the second ring portion connected to each other. In addition, the cylindrical portion is disposed between the first ring portion and the second ring portion, such that the accommodating space is formed between the first ring portion, the cylindrical portion and the second ring portion. The light source board of the ultra-thin downlight is fixed on the inner surface of the second ring portion, so a portion of the light source portion is covered by the second ring portion and the other portion is exposed from the second ring portion. Therefore, the above partially-exposed structure can swiftly dissipate the heat generated by the light source board, which can significantly enhance the thermal dissipation performance of the ultra-thin downlight in order to avoid that the components inside the ultra-thin downlight are deformed or degraded due to high temperature.

(2) In one embodiment of the present invention, the housing of the ultra-thin downlight has the partially-exposed structure, which can reduce the cost thereof as well as directly decrease the manufacturing cost thereof. Therefore, the ultra-thin downlight can be more comprehensive in application in order to conform to the trend of the market.

(3) In one embodiment of the present invention, the ultra-thin downlight has the connecting wire and one end of the connecting wire is provided with the strain relief portion. The connecting wire passes through the recess and is connected to the connecting slot of the light source board via the strain relief portion so as to fix the above components with each other and provide the strain relief effect. The above structure not only can decrease the material cost of the ultra-thin downlight, but also can further reduce the manufacturing cost thereof.

(4) In one embodiment of the present invention, the housing of the ultra-thin downlight integrates the partially-exposed structure with the direct-lighting type structure, such that the thickness of the ultra-thin downlight can be greatly reduced. Therefore, the manufacturing cost and the packaging cost thereof can be further decreased. Accordingly, the ultra-thin downlight can be more comprehensive in application in order to meet the trend of the market.

(5) In one embodiment of the present invention, the spring fixation plate of the ultra-thin downlight has the fixation base and the fixation portion connected to each other. Besides, the fixation portion has two L-shaped hook portions respectively inserted into the two ends of the spring disposed at one end of the spring buckle, such that the two ends of the spring can press against the aforementioned two L-shaped hook portions respectively. The above structure design can make the spring buckle not tend to be loose without adjusting the torque of the above fixation structure, which can effectively enhance the structural stability and the safety of the ultra-thin downlight.

(6) In one embodiment of the present invention, the ultra-thin downlight has the specially-designed housing. The outer surface of the second ring portion of the housing has the positioning block and the fixation base of the spring fixation plate has the positioning slot, such that the positioning block can be inserted into the positioning slot. The above structure design can make the spring fixation plate be more stably fixed on the second ring portion, such that the structural stability and the safety of the ultra-thin downlight can be further enhanced.

(7) In one embodiment of the present invention, the housing of the ultra-thin downlight has the first ring portion. In addition, the outer surface of the first ring portion has the ring-shaped groove and the elastic ring body can be disposed in the ring-shaped groove so as to achieve buffering effect. Via the above structure design, the ultra-thin downlight can be easily leveled when the user installs the downlight, which can effectively increase the installation efficiency of the ultra-thin downlight.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
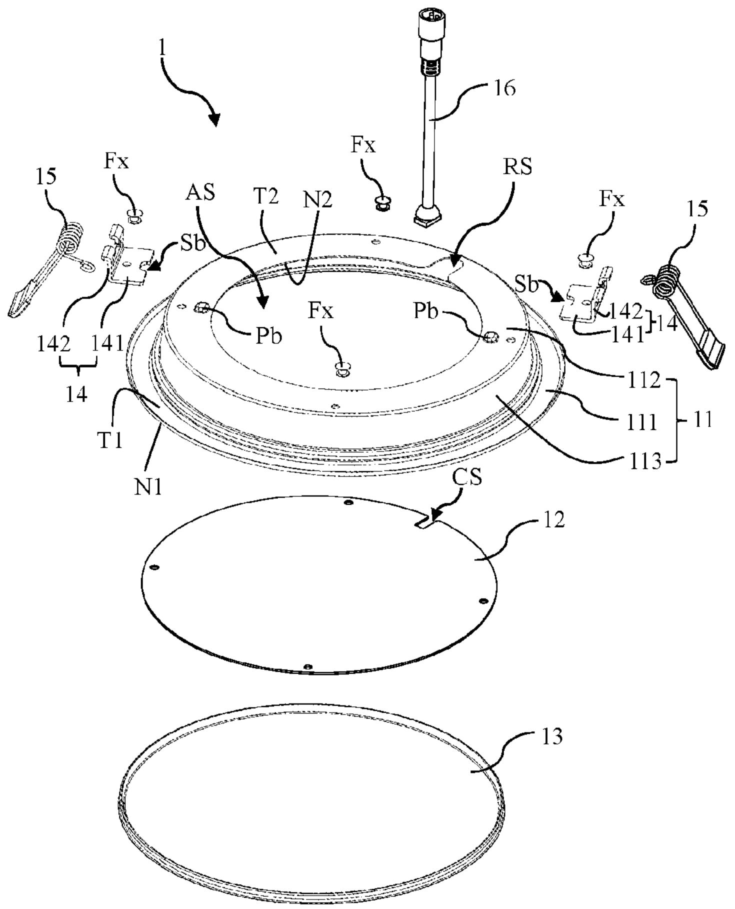
FIG. 1 is an exploded view of an ultra-thin downlight with high heat dissipation performance in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is “coupled” or “connected” to another element, the element may be “directly coupled” or “directly connected” to the other element or “coupled” or “connected” to the other element through a third element. In contrast, it should be understood that, when it is described that an element is “directly coupled” or “directly connected” to another element, there are no intervening elements.

Figure 2:
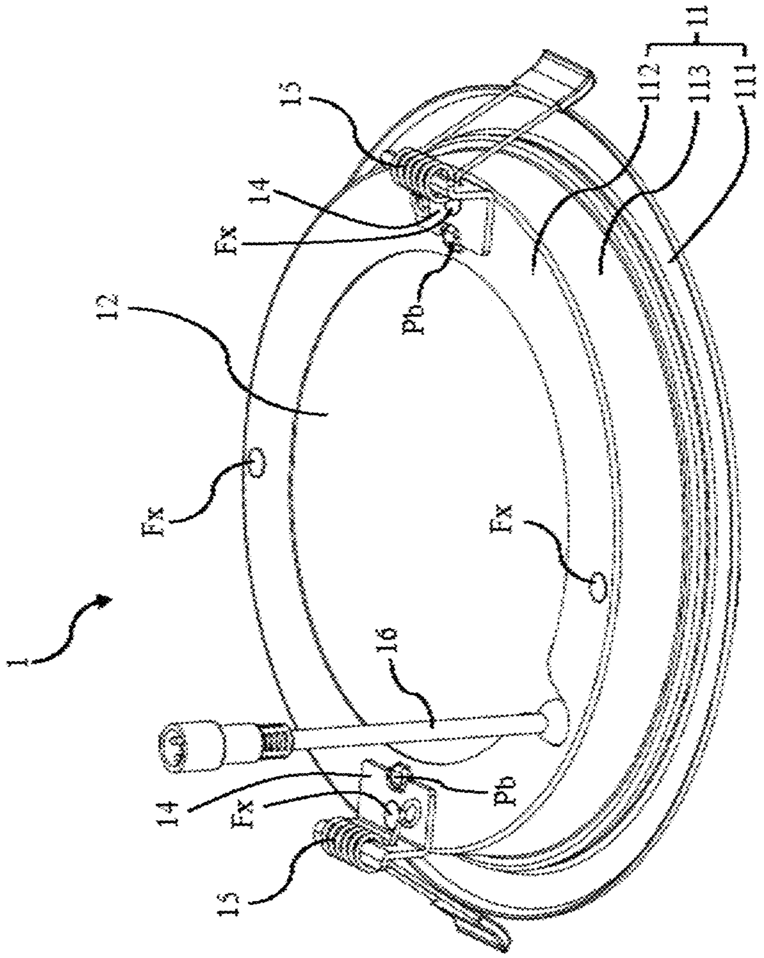
FIG. 2 is an assembly view of the ultra-thin downlight with high heat dissipation performance in accordance with one embodiment of the present invention.
Figure 3:
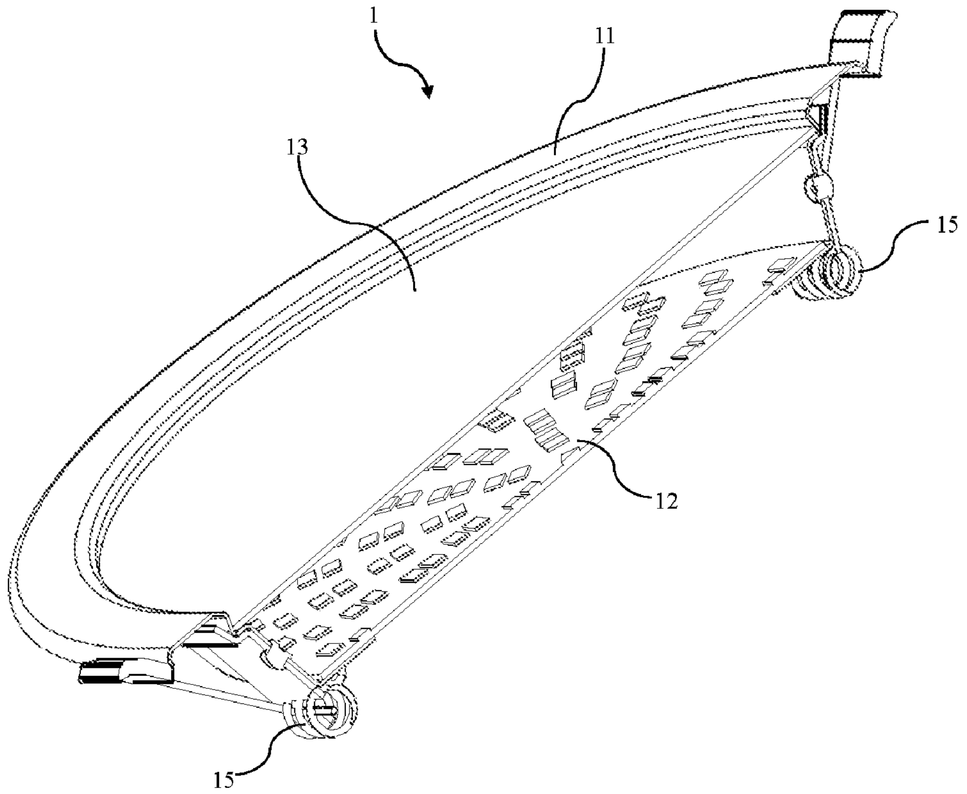
FIG. 3 is a first sectional view of the ultra-thin downlight with high heat dissipation performance in accordance with one embodiment of the present invention.
Figure 4:
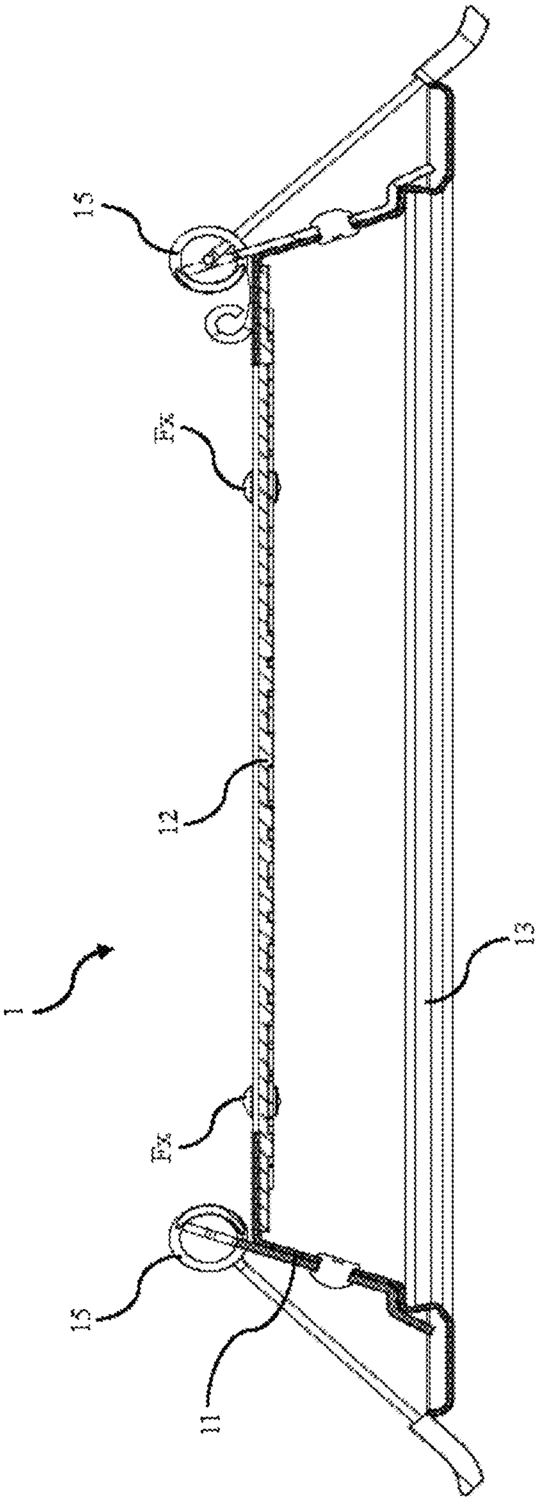
FIG. 4 is a second sectional view of the ultra-thin downlight with high heat dissipation performance in accordance with one embodiment of the present invention.

Please refer to FIG. 1, FIG. 2, FIG. 3 and FIG. 4. FIG. 1 is an exploded view of an ultra-thin downlight with high heat dissipation performance in accordance with one embodiment of the present invention. FIG. 2 is an assembly view of the ultra-thin downlight. FIG. 3 is a first sectional view of the ultra-thin downlight. FIG. 4 is a second sectional view of the ultra-thin downlight. As shown in FIG. 1-FIG. 4, the ultra-thin downlight 1 includes a housing 11, a light source board 12, a light cover 13, two spring fixation plates 14, two spring buckles 15 and a connecting wire 16.

The housing 11 includes a first ring portion 111, a cylindrical portion 113 and a second ring portion 112. The cylindrical portion 113 is disposed between the first ring portion 111 and the second ring portion 112, such that an accommodating space AS is formed between the first ring portion 111, the cylindrical portion 113 and the second ring portion 112. In addition, the second ring portion 112 has a recess RS. In one embodiment, the housing 11 may be made of plastics or metal (aluminum, iron, stainless steel, etc.).

The light source board 12 if fixed on the inner surface N2 of the second ring portion 112 (which is opposite to the outer surface T2 of the second ring portion 12) via two (or more than two) fixation elements Fx, such that the light source board 12 is disposed in the accommodating space AS. The second ring portion 112 is ring-shaped. Thus, one portion of the light source board 12 (the peripheral area of the light source board 12) is covered by the second ring portion 112 and the other portion of the light source board 112 (the middle area of the light source board 112) is exposed from the second ring portion 112. In addition, the light source board 112 has a connecting slot CS corresponding to the recess RS. In one embodiment, the light source board 112 may include a substrate and a plurality of light sources. The above light sources may be light-emitting diodes (LED). Via the above partially-exposed structure, the heat generated by the light source board 12 can be swiftly dissipated, which can significantly enhance the heat dissipation performance of the ultra-thin downlight 1 and avoid that the components inside the ultra-thin downlight 1 are deformed or degraded because of high temperature. Accordingly, the service life of the ultra-thin downlight 1 can be effectively increased and the performance thereof can be also improved. In one embodiment, the fixation elements Fx may be rivets, screws or other similar elements.

The light cover 13 is disposed on the inner surface N1 of the first ring portion 111 (which is opposite to the outer surface T1 of the first ring portion 111). In the embodiment, the distance between the light cover 13 and the light source board 12 is less than or equal to 14 mm. In one embodiment, the light cover 13 may be made of a transparent or translucent material, such as glass, plastics, etc.

Each of the spring fixation plates 14 can be fixed on the outer surface T2 of the second ring portion 112. One end of each spring buckle 15 is provided with a spring and the other end thereof is provided a buckle. One end of each spring buckle 15 is pivotally connected to the spring fixation plate 14 and the other end thereof is fixed on the peripheral area of the first ring portion 111. In addition, the spring fixation plate 14 includes a fixation base 141 and a fixation portion 142 connected to each other. The fixation base 141 is fixed on the outer surface T2 of the second ring portion 112 and one end of the spring buckle 15 is pivotally connected to the fixation portion 142. In the embodiment, the outer surface T2 of the second ring portion 112 is provided with a positioning block Pb. The fixation base 141 is provided with a positioning slot Sb and the positioning block Pb is inserted into the positioning slot Sb. The above structure design makes the spring fixation plate 14 can be more stably fixed on the second ring portion 112, such that the structural stability and the safety of the ultra-thin downlight 1 can be further enhanced. In one embodiment, the fixation elements Fx may be rivets, screws or other similar elements.

One end of the connecting wire 16 passes through the recess RS of the second ring portion 112 so as to connect to the connecting slot CS of the light source plate 112, and the other end thereof is connected to the control box.

As set forth above, the housing 11 of the ultra-thin downlight 1 has the first ring portion 111, the cylindrical portion 113 and the second ring portion 112 connected to each other. The cylindrical portion 113 is disposed between the first ring portion 111 and the second ring portion 112 so as to form the accommodating space AS. The light source board 12 of the ultra-thin downlight 1 is fixed on the inner surface N2 of the second ring portion 112, such that one portion of the light source board 12 is covered by the second ring portion 112 and the other portion of the light source board 112 is exposed from the second ring portion 112. Therefore, via the above partially-exposed structure, the heat generated by the light source board 12 can be dissipated in a short time, which can significantly enhance the heat dissipation performance of the ultra-thin downlight 1 and avoid that the components inside the ultra-thin downlight 1 are deformed or degraded because of high temperature. Accordingly, the service life of the ultra-thin downlight 1 can be effectively increased.

Moreover, the housing 11 of the ultra-thin downlight 1 integrates the partially-exposed structure with the direct-lighting type structure, such that the thickness (which can be lower than 25 mm) of the ultra-thin downlight 1 can be greatly reduced. Therefore, the manufacturing cost thereof can be further decreased. Accordingly, the ultra-thin downlight 1 can be more comprehensive in application in order to meet the trend of the market.

Furthermore, the housing 11 of the ultra-thin downlight 1 has the partially-exposed structure, which can reduce the cost thereof as well as directly decrease the manufacturing cost thereof. Therefore, the ultra-thin downlight 1 can be more comprehensive in application in order to conform to the trend of the market.

The embodiment just exemplifies the present invention and is not intended to limit the scope of the present invention; any equivalent modification and variation according to the spirit of the present invention is to be also included within the scope of the following claims and their equivalents.

Figure 5:
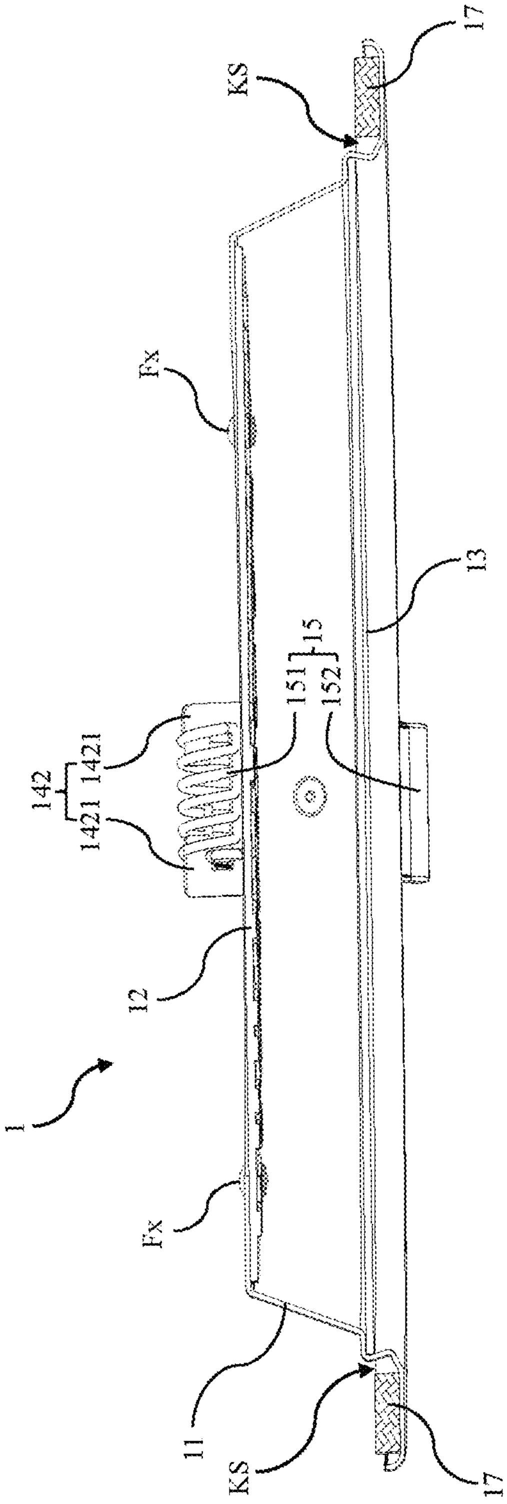
FIG. 5 is a third sectional view of the ultra-thin downlight with high heat dissipation performance in accordance with one embodiment of the present invention.

Please refer to FIG. 5, which is a third sectional view of the ultra-thin downlight with high heat dissipation performance in accordance with one embodiment of the present invention; please also refer to FIG. 1. As shown in FIG. 5, the spring fixation plate 14 includes the fixation base 141 and the fixation portion 142 connected to each other. The fixation portion 142 has two L-shaped hook portions 1421 opposite to each other. One end of the spring buckle 15 is provided with a spring 151 and the other end thereof is provided with a buckle 152. The two L-shaped hook portions 1421 are inserted into the two ends of the spring 151 of the spring buckle 15 respectively, such that the two ends of the spring 151 of one end of the spring buckle 15 press against the two L-shaped hook portions 1421 respectively and the buckle 152 of the other end of the spring buckle 15 is fixed on the peripheral area of the first ring portion 111. The above structure design makes the spring buckle 15 not tend to be loose without adjusting the torque of the above fixation structure, which can effectively enhance the structural stability and the safety of the ultra-thin downlight 1.

In addition, the ultra-thin downlight 1 further includes an elastic ring body 17. The outer surface T1 of the first ring portion 11 has the ring-shaped groove KS and the elastic ring body 17 can be disposed in the ring-shaped groove KS so as to achieve buffering effect. Via the above structure design, the ultra-thin downlight 1 can be easily leveled when the user installs the downlight, which can effectively increase the installation efficiency of the ultra-thin downlight 1 with a view to meet actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that most of currently available downlights adopts the indirect-lighting type structure with a light guide plate, which tends to generate high thermal energy. As the heat dissipation performance of this type of downlight is low, the light guide plate thereof is apt to be deformed or degraded due to high temperature. Accordingly, the service life of this type of downlight tends to decrease. On the contrary, according to one embodiment of the present invention, the housing of the ultra-thin downlight includes the first ring portion, the cylindrical portion and the second ring portion connected to each other. In addition, the cylindrical portion is disposed between the first ring portion and the second ring portion, such that the accommodating space is formed between the first ring portion, the cylindrical portion and the second ring portion. The light source board of the ultra-thin downlight is fixed on the inner surface of the second ring portion, so a portion of the light source portion is covered by the second ring portion and the other portion is exposed from the second ring portion. Therefore, the above partially-exposed structure can swiftly dissipate the heat generated by the light source board, which can significantly enhance the thermal dissipation performance of the ultra-thin downlight in order to avoid that the components inside the ultra-thin downlight are deformed or degraded due to high temperature.

According to one embodiment of the present invention, the housing of the ultra-thin downlight has the partially-exposed structure, which can reduce the cost thereof as well as directly decrease the manufacturing cost thereof. Therefore, the ultra-thin downlight can be more comprehensive in application in order to conform to the trend of the market.

According to one embodiment of the present invention, the ultra-thin downlight has the connecting wire and one end of the connecting wire is provided with the strain relief portion. The connecting wire passes through the recess and is connected to the connecting slot of the light source board via the strain relief portion so as to fix the above components with each other and provide the strain relief effect. The above structure not only can decrease the material cost of the ultra-thin downlight, but also can further reduce the manufacturing cost thereof.

Also, according to one embodiment of the present invention, the housing of the ultra-thin downlight integrates the partially-exposed structure with the direct-lighting type structure, such that the thickness of the ultra-thin downlight can be greatly reduced. Therefore, the manufacturing cost and the packaging cost thereof can be further decreased. Accordingly, the ultra-thin downlight can be more comprehensive in application in order to meet the trend of the market.

Further, according to one embodiment of the present invention, the spring fixation plate of the ultra-thin downlight has the fixation base and the fixation portion connected to each other. Besides, the fixation portion has two L-shaped hook portions respectively inserted into the two ends of the spring disposed at one end of the spring buckle, such that the two ends of the spring can press against the aforementioned two L-shaped hook portions respectively. The above structure design can make the spring buckle not tend to be loose without adjusting the torque of the above fixation structure, which can effectively enhance the structural stability and the safety of the ultra-thin downlight.

Moreover, according to one embodiment of the present invention, the ultra-thin downlight has the specially-designed housing. The outer surface of the second ring portion of the housing has the positioning block and the fixation base of the spring fixation plate has the positioning slot, such that the positioning block can be inserted into the positioning slot. The above structure design can make the spring fixation plate be more stably fixed on the second ring portion, such that the structural stability and the safety of the ultra-thin downlight can be further enhanced.

Furthermore, according to one embodiment of the present invention, the housing of the ultra-thin downlight has the first ring portion. In addition, the outer surface of the first ring portion has the ring-shaped groove and the elastic ring body can be disposed in the ring-shaped groove so as to achieve buffering effect. Via the above structure design, the ultra-thin downlight can be easily leveled when the user installs the downlight, which can effectively increase the installation efficiency of the ultra-thin downlight. As described above, the ultra-thin downlight 1 according to the present invention can definitely achieve great technical effects.

Figure 7:
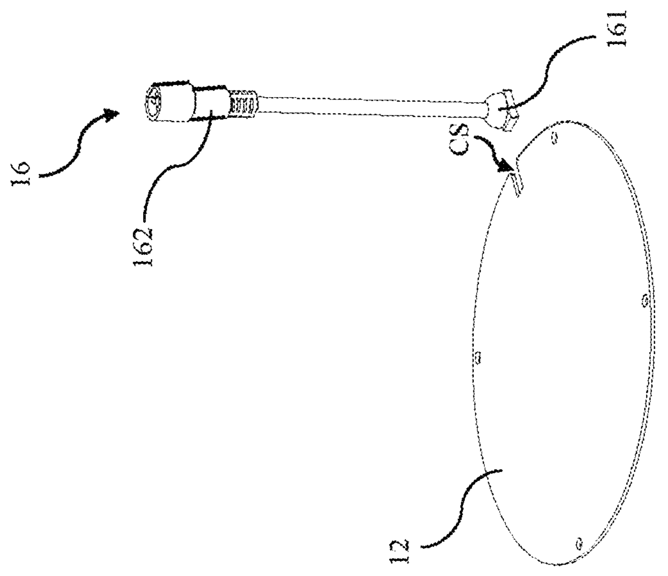
FIG. 7 is a second schematic view for illustrating the structure of the connecting wire of the ultra-thin downlight with high heat dissipation performance in accordance with one embodiment of the present invention.
Figure 6:
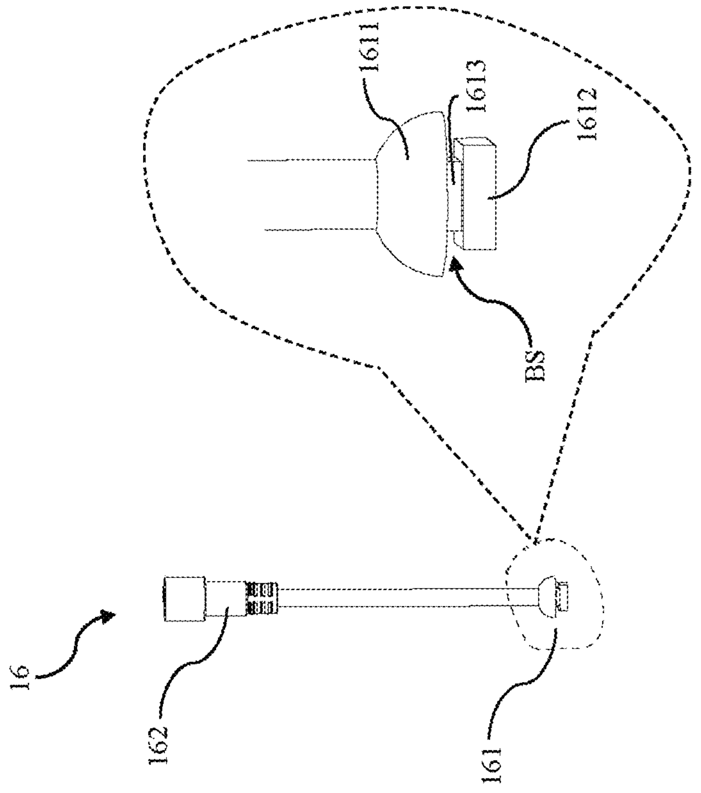
FIG. 6 is a first schematic view for illustrating a structure of a connecting wire of the ultra-thin downlight with high heat dissipation performance in accordance with one embodiment of the present invention.

Please refer to FIG. 6 and FIG. 7, which are a first schematic view and a second schematic view for illustrating a structure of a connecting wire of the ultra-thin downlight with high heat dissipation performance in accordance with one embodiment of the present invention. As shown in FIG. 6 and FIG. 7, one end of the connecting wire 16 is provided with a strain relief portion 161 and the other end thereof is provided with a connector 162. The strain relief portion 161 includes a positioning element 1611, a block element 162 and a connecting element 163. The positioning element 1611 is connected to the block element 1612 via the connecting element 1613, such that a locking slot BS is formed between the positioning element 1611 and the block element 1612.

Thus, the locking slot BS of the strain relief portion 161 can be engaged with the connecting slot CS. Via the above structure, the connecting wire can pass through the recess RS of the second ring portion 112 and be connected to the connecting slot CS of the light source board 12 via the strain relief portion 161 so as to fix the above components with each other and provide the strain relief effect. The above structure not only can decrease the material cost of the ultra-thin downlight 1, but also can further reduce the manufacturing cost thereof.

The embodiment just exemplifies the present invention and is not intended to limit the scope of the present invention; any equivalent modification and variation according to the spirit of the present invention is to be also included within the scope of the following claims and their equivalents.

Figure 8:
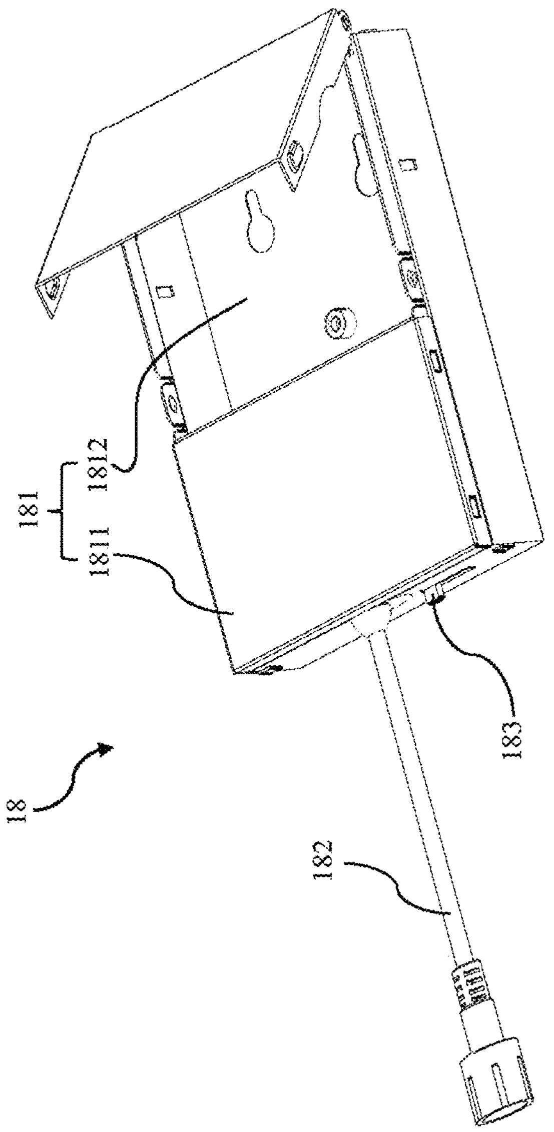
FIG. 8 is a schematic view for illustrating a structure of a control box of the ultra-thin downlight with high heat dissipation performance in accordance with one embodiment of the present invention.

Please refer to FIG. 8, which is a schematic view for illustrating a structure of a control box of the ultra-thin downlight with high heat dissipation performance in accordance with one embodiment of the present invention. As shown in FIG. 8, the ultra-thin downlight 1 further includes a control box 18. The control box 18 includes a main body 181, a control wire 182 and a switch 183.

The main body 181 may include a driving box 1811 and a junction box 1812. The driving box 1811 includes one or more of a power supply circuit, a filter circuit, a rectifying circuit and a driving circuit. The driving box 1812 may include some necessary circuits.

The control wire 182 is connected to the connector 162 of the connecting wire 16.

The switch 183 is disposed on the main body 181. The user can adjust the brightness, color temperature or other parameters of the light source board 12 via the switch 183 with a view to conform to actual requirements.

The embodiment just exemplifies the present invention and is not intended to limit the scope of the present invention; any equivalent modification and variation according to the spirit of the present invention is to be also included within the scope of the following claims and their equivalents.

Figure 9:
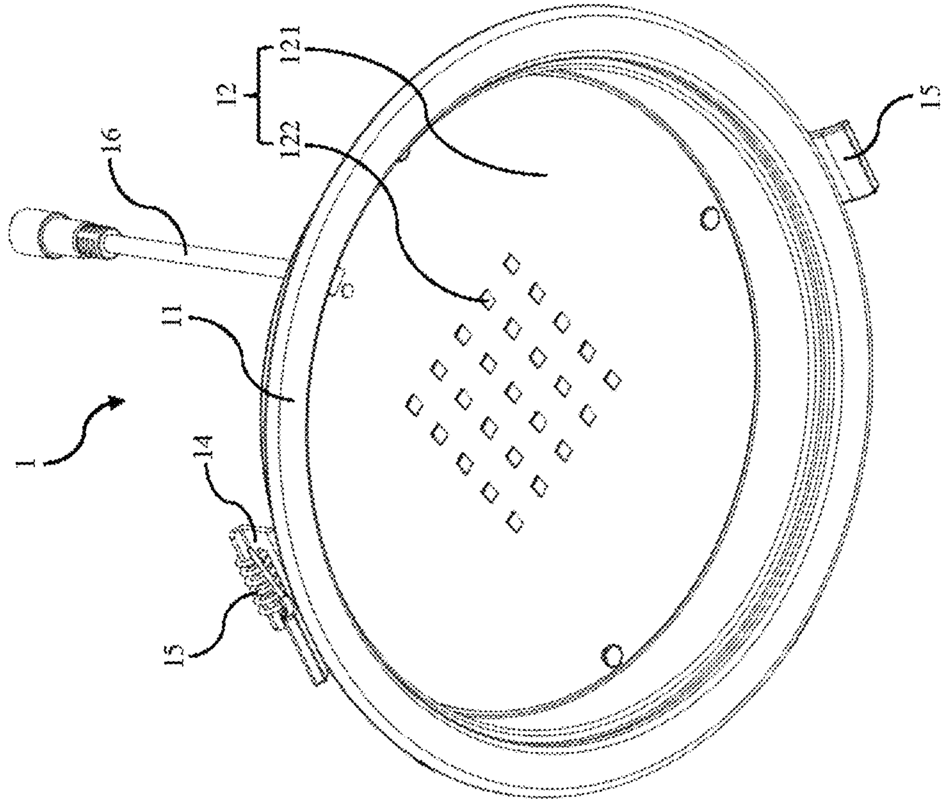
FIG. 9 is a schematic view for illustrating a structure of a light source board of the ultra-thin downlight with high heat dissipation performance in accordance with one embodiment of the present invention.

Please refer to FIG. 9, which is a schematic view for illustrating a structure of a light source board of the ultra-thin downlight with high heat dissipation performance in accordance with one embodiment of the present invention; please also refer to FIG. 1. As shown in FIG. 1 and FIG. 9, the light source board 112 may include a substrate 121 and a plurality of light sources 122. The light sources 122 may be LEDs. The number of the above light sources 122 can be adjusted according to actual requirements. In another embodiment, the light sources 122 may be other currently available light-emitting elements. In one embodiment, the substrate 121 may be made of metal, fiberglass, composite material or other proper materials.

The embodiment just exemplifies the present invention and is not intended to limit the scope of the present invention; any equivalent modification and variation according to the spirit of the present invention is to be also included within the scope of the following claims and their equivalents.

Figure 10:
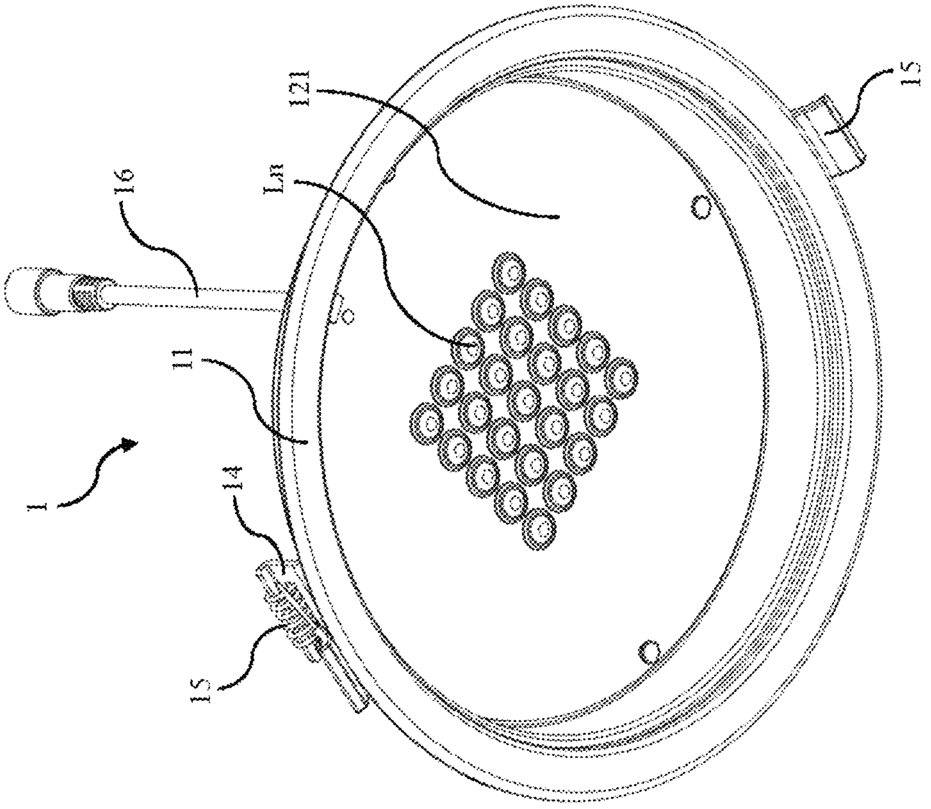
FIG. 10 is a schematic view for illustrating a structure of a light source board of an ultra-thin downlight with high heat dissipation performance in accordance with another embodiment of the present invention.

Please refer to FIG. 10, which is a schematic view for illustrating a structure of a light source board of an ultra-thin downlight with high heat dissipation performance in accordance with another embodiment of the present invention; please also refer to FIG. 1 and FIG. 9. As shown in FIG. 1, FIG. 9 and FIG. 10, the light source board 112 may include a substrate 121 and a plurality of light sources 122, and each of the light sources 122 can be covered by a lens Ln.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the housing of the ultra-thin downlight includes the first ring portion, the cylindrical portion and the second ring portion connected to each other. In addition, the cylindrical portion is disposed between the first ring portion and the second ring portion, such that the accommodating space is formed between the first ring portion, the cylindrical portion and the second ring portion. The light source board of the ultra-thin downlight is fixed on the inner surface of the second ring portion, so a portion of the light source portion is covered by the second ring portion and the other portion is exposed from the second ring portion. Therefore, the above partially-exposed structure can swiftly dissipate the heat generated by the light source board, which can significantly enhance the thermal dissipation performance of the ultra-thin downlight in order to avoid that the components inside the ultra-thin downlight are deformed or degraded due to high temperature.

According to one embodiment of the present invention, the housing of the ultra-thin downlight has the partially-exposed structure, which can reduce the cost thereof as well as directly decrease the manufacturing cost thereof. Therefore, the ultra-thin downlight can be more comprehensive in application in order to conform to the trend of the market.

According to one embodiment of the present invention, the ultra-thin downlight has the connecting wire and one end of the connecting wire is provided with the strain relief portion. The connecting wire passes through the recess and is connected to the connecting slot of the light source board via the strain relief portion so as to fix the above components with each other and provide the strain relief effect. The above structure not only can decrease the material cost of the ultra-thin downlight, but also can further reduce the manufacturing cost thereof.

Also, according to one embodiment of the present invention, the housing of the ultra-thin downlight integrates the partially-exposed structure with the direct-lighting type structure, such that the thickness of the ultra-thin downlight can be greatly reduced. Therefore, the manufacturing cost and the packaging cost thereof can be further decreased. Accordingly, the ultra-thin downlight can be more comprehensive in application in order to meet the trend of the market.

Further, according to one embodiment of the present invention, the spring fixation plate of the ultra-thin downlight has the fixation base and the fixation portion connected to each other. Besides, the fixation portion has two L-shaped hook portions respectively inserted into the two ends of the spring disposed at one end of the spring buckle, such that the two ends of the spring can press against the aforementioned two L-shaped hook portions respectively. The above structure design can make the spring buckle not tend to be loose without adjusting the torque of the above fixation structure, which can effectively enhance the structural stability and the safety of the ultra-thin downlight.

Moreover, according to one embodiment of the present invention, the ultra-thin downlight has the specially-designed housing. The outer surface of the second ring portion of the housing has the positioning block and the fixation base of the spring fixation plate has the positioning slot, such that the positioning block can be inserted into the positioning slot. The above structure design can make the spring fixation plate be more stably fixed on the second ring portion, such that the structural stability and the safety of the ultra-thin downlight can be further enhanced.

Furthermore, according to one embodiment of the present invention, the housing of the ultra-thin downlight has the first ring portion. In addition, the outer surface of the first ring portion has the ring-shaped groove and the elastic ring body can be disposed in the ring-shaped groove so as to achieve buffering effect. Via the above structure design, the ultra-thin downlight can be easily leveled when the user installs the downlight, which can effectively increase the installation efficiency of the ultra-thin downlight.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultra-thin downlight with enhanced thermal dissipation performance, comprising:

a housing comprising a first ring portion, a cylindrical portion and a second ring portion connected to each other, wherein the cylindrical portion is disposed between the first ring portion and the second ring portion, whereby an accommodating space is formed between the first ring portion, the cylindrical portion and the second ring portion;

a light source board fixed on an inner surface of the second ring portion and disposed in the accommodating space, wherein a portion of the light source board is covered by the second ring portion and the other portion of the light source board is exposed from the second ring portion;

a light cover disposed on an inner surface of the first ring portion;

a spring fixation plate fixed on an outer surface of the second ring portion, and comprising a fixation base and a fixation portion, wherein the fixation base and the fixation portion are connected to each other, and the fixation base is fixed on the outer surface of the second ring portion and one end of the spring buckle is pivotally connected to the fixation portion, wherein the fixation base has a positioning slot and the outer surface of the second ring portion has a positioning block inserted into the positioning slot; and a spring buckle, wherein one end of the spring buckle is pivotally connected to the spring fixation plate, and the other end of the spring buckle is disposed on a peripheral area of the first ring portion.

2. The ultra-thin downlight with enhanced thermal dissipation performance as claimed in claim 1, further comprising an elastic ring body, wherein an outer surface of the first ring portion has a ring-shaped groove and the elastic ring body is disposed in the ring-shaped groove.

3. The ultra-thin downlight with enhanced thermal dissipation performance as claimed in claim 1, wherein the fixation portion comprises two L-shaped hook portions disposed to be opposite to each other and one end of the spring buckle is provided with a spring, wherein the two L-shaped hook portions are inserted into two ends of the spring, whereby the two ends of the spring press against the two L-shaped hook portions.

4. The ultra-thin downlight with enhanced thermal dissipation performance as claimed in claim 1, wherein the second ring portion has a recess and the light source board has a connecting slot corresponding to the recess.

5. The ultra-thin downlight with enhanced thermal dissipation performance as claimed in claim 4, further comprising a connecting wire, wherein one end of the connecting wire has a strain relief portion, the connecting wire passes through the recess and is connected to the connecting slot via the strain relief portion.

6. The ultra-thin downlight with enhanced thermal dissipation performance as claimed in claim 5, wherein the strain relief portion comprises a positioning element, a block element and a connecting element, wherein the positioning element is connected to the block element via the connecting element, whereby a locking slot is formed between the positioning element and the block element.

7. The ultra-thin downlight with enhanced thermal dissipation performance as claimed in claim 5, further comprising a control box connected to the other end of the connecting wire.

* * * * *